(12) United States Patent
Jin et al.

(10) Patent No.: US 11,042,065 B2
(45) Date of Patent: Jun. 22, 2021

(54) DISPLAY DEVICE

(71) Applicant: SAMSUNG DISPLAY CO., LTD., Yongin-si (KR)

(72) Inventors: Yongsu Jin, Cheonan-si (KR); Ki-Soo Nam, Asan-si (KR); Giyoung Kang, Cheonan-si (KR); Jisang Seo, Gwangju (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 220 days.

(21) Appl. No.: 16/001,136

(22) Filed: Jun. 6, 2018

(65) Prior Publication Data

US 2019/0101780 A1 Apr. 4, 2019

(30) Foreign Application Priority Data

Sep. 29, 2017 (KR) .................. 10-2017-0128092

(51) Int. Cl.
*G02F 1/1339* (2006.01)
*G02F 1/1362* (2006.01)
*G02F 1/1333* (2006.01)

(52) U.S. Cl.
CPC .... *G02F 1/13394* (2013.01); *G02F 1/133308* (2013.01); *G02F 1/136286* (2013.01); *G02F 1/133311* (2021.01); *G02F 1/133317* (2021.01)

(58) Field of Classification Search
CPC ............. G02F 1/1339; G02F 1/13394; G02F 1/133308; G02F 2001/13396; G02F 2001/13398; G02F 2001/133311; G02F 2001/133317; G02F 2001/13332
See application file for complete search history.

(56) References Cited

U.S. PATENT DOCUMENTS

| 9,664,946 | B2 | 5/2017 | Kim et al. |
| 2015/0049424 | A1 | 2/2015 | Wu et al. |
| 2017/0003538 | A1* | 1/2017 | Wang .................. G02F 1/1339 |
| 2017/0123274 | A1 | 5/2017 | Jeong et al. |

FOREIGN PATENT DOCUMENTS

| JP | 2011-033909 | 2/2011 |
| KR | 10-2015-0020993 | 2/2015 |
| KR | 10-2016-0117858 | 10/2016 |
| KR | 10-2017-0049783 | 5/2017 |

* cited by examiner

*Primary Examiner* — Sean P Gramling
(74) *Attorney, Agent, or Firm* — F. Chau & Associates, LLC

(57) ABSTRACT

A display device includes a display panel, a plurality of connection films covering an edge of the display panel, and a plurality of spacer members disposed on the display panel. Each of the spacer members includes first and second long sides extending in a first direction, and an outer line connecting the first and second long sides to each other. The outer line includes a plurality of lines extending in different directions. A first outer line of a first spacer member of the plurality of spacer members is adjacent to a second outer line of a second spacer member of the plurality of spacer members. A shape of the first outer line corresponds to a shape of the second outer line. A gap between the first outer line and the second outer line is aligned with at least one of the plurality of connection films.

20 Claims, 12 Drawing Sheets

DISPLAY DEVICE

CROSS-REFERENCE TO RELATED APPLICATION

This application claims priority under 35 U.S.C. § 119 to Korean Patent Application No. 10-2017-0128092, filed on Sep. 29, 2017, the disclosure of which is incorporated by reference herein in its entirety.

TECHNICAL FIELD

Exemplary Embodiments of the present invention relate to a display device.

DISCUSSION OF THE RELATED ART

A display device receives image data to display an image to a user. To meet an increased desire of larger display devices in the electronic industry, large-sized display devices have been under development. As the sizes of the display devices increase, sizes of spacer members used in the display devices increase. Due to the increase in size of the spacer members, the workability and handling of the members may be reduced or may deteriorate.

SUMMARY

According to an exemplary embodiment of the present invention, a display device includes a display panel that displays an image, a plurality of connection films covering an edge of the display panel and arranged in a first direction, and a plurality of spacer members disposed on a first surface of the display panel and arranged in the first direction. Each of the spacer members includes first and second long sides extending in the first direction, and an outer line connecting the first and second long sides to each other. The outer line includes a plurality of lines extending in different directions. A first outer line of a first spacer member of the plurality of spacer members is adjacent to a second outer line of a second spacer member of the plurality of spacer members. A shape of the first outer line corresponds to a shape of the second outer line. A gap between the first outer line and the second outer line is aligned with at least one of the plurality of connection films in a second direction intersecting the first direction.

In an exemplary embodiment of the present invention, the first outer line includes a first line extending from the first long side in the second direction, a second line extending from the first line in the first direction, a third line extending from the second line in a direction toward the first long side, a fourth line extending from the third line in the first direction, and a fifth line extending from the fourth line to the second long side and connected to the second long side.

In an exemplary embodiment of the present invention, the first outer line includes a first line extending from the first long side in the second direction, a second line extending from the first line in the first direction, a third line extending from the second line in the second direction, a fourth line extending from the third line in the first direction, and a fifth line extending from the fourth line to the second long side and connected to the second long side.

In an exemplary embodiment of the present invention, the first outer line includes a first line extending from the first long side in the second direction, a second line extending from the first line in the first direction, a third line extending from the second line in the second direction, a fourth line extending from the third line in a direction opposite to the first direction, and a fifth line extending from the fourth line to the second long side and connected to the second long side.

In an exemplary embodiment of the present invention, the first outer line includes a first line extending from the first long side in the second direction, a second line extending from the first line in the first direction, a third line extending from the second line in a direction toward the first long side, a fourth line extending from the third line in the first direction, a fifth line extending from the fourth line in the second direction, a sixth line extending from the fifth line in a direction opposite to the first direction, a seventh line extending from the sixth line in the direction toward the first long side, an eighth line extending from the seventh line in the direction opposite to the first direction, and a ninth line extending from the eighth line to the second long side and connected to the second long side.

In an exemplary embodiment of the present invention, the first outer line has a slanted shape.

In an exemplary embodiment of the present invention, the first outer line includes a first line extending in a third direction. The third direction is between the first direction and the second direction, and the second direction is perpendicular to the first direction. The first outer line further includes a second line extending from the first line in a fourth direction intersecting the third direction.

In an exemplary embodiment of the present invention, the first outer line further includes a third line extending from the first long side in the fourth direction toward the first line. The third line is connected to the first line.

In an exemplary embodiment of the present invention, the first outer line includes a first line extending from the first long side in the second direction, a second line extending from the first line in a direction that is toward the first long side and intersects the first direction and the second direction. The second direction is perpendicular to the first direction. The first outer line further includes a third line extending from the second line in the second direction.

In an exemplary embodiment of the present invention, the first outer line is a curved line.

In an exemplary embodiment of the present invention, the display device further includes intersection spacer members disposed on the first surface of the display panel. Each of the intersection spacer members includes first and second long sides extending in the second direction, and an intersection outer line connecting the first and second long sides. A first intersection outer line of the intersection outer lines is adjacent to a first spacer member of the plurality of spacer members. A line of the first spacer member, which faces the first intersection outer line, is a second intersection outer line. Each of the first and second intersection outer lines includes a plurality of lines extending in different directions from each other. The first and second intersection outer lines face each other and have shapes corresponding to each other.

In an exemplary embodiment of the present invention, the outer line connects the first and second long sides to each other and includes at least four lines.

In an exemplary embodiment of the present invention, the display device further includes a top chassis disposed on the display panel to cover a non-display area of the display panel, a frame disposed under the display panel to support the display panel, and a plurality of opposite spacer members disposed on a second surface of the display panel opposite to the first surface of the display panel and arranged in the first direction. Each of the opposite spacer members includes long sides extending in the first direction, and lines connecting the long sides to each other and extending in different directions. The plurality of spacer members is disposed between the display panel and the top chassis. The plurality of opposite spacer members is disposed between the display panel and the frame.

In an exemplary embodiment of the present invention, the display device further includes a light guide plate disposed under the display panel, and a light source disposed at a side of the light guide plate to provide light to the light guide plate. The plurality of spacer members is disposed between the display panel and the light guide plate.

According to an exemplary embodiment of the present invention, a display device includes a display panel including a display area that displays an image, and a non-display area that does not display the image. The display device further includes a plurality of connection films arranged on one side of the non-display area in a first direction, a first spacer member disposed between the display area and the plurality of connection films, and a second spacer member disposed between the display area and the plurality of connection films. The second spacer member is spaced apart from the first spacer member in the first direction. A direction of a gap between the first spacer member and the second spacer member is changed at least once.

In an exemplary embodiment of the present invention, the gap is aligned with at least one of the plurality of connection films in a second direction intersecting the first direction.

In an exemplary embodiment of the present invention, an end portion of the first spacer member and an end portion of the second spacer member face each other and have shapes corresponds to each other.

According to an exemplary embodiment of the present invention, a display device includes a display panel that displays an image, and a plurality of spacer members disposed on a front surface and a back surface of the display panel and arranged in a first direction. Each of the spacer members includes a first long side and a second long side, both extending in the first direction, and an outer line connecting the first and second long sides to each other. The plurality of spacer members includes a first spacer member including a first outer line and a second spacer member including a second outer line facing the first outer line. The second long side is opposite the first long side. The first outer line includes a protrusion and the second outer line includes a recess with a shape to receive the protrusion of the first outer line.

In an exemplary embodiment of the present invention, the first spacer member and the second spacer member are disposed on the front surface of the display panel, and the plurality of spacer members further includes a third and a fourth spacer member disposed on the back surface of the display panel. The third spacer member includes a third outer line including a plurality of lines extending in different directions from each other, and the fourth spacer member includes a fourth outer line including a plurality of lines extending in different directions from each other. A shape of the third outer line corresponds to a shape of the fourth outer line.

In an exemplary embodiment of the present invention, the shape of the protrusion of the first outer line and the shape of the recess of the second outer line are different from the shape of the third outer line and the shape of the fourth outer line.

BRIEF DESCRIPTION OF THE DRAWINGS

The above and other features of the present invention will become more apparent by describing in detail exemplary embodiments thereof, with reference to the accompanying drawings, in which.

DETAILED DESCRIPTION OF THE EMBODIMENTS

Figure 1:
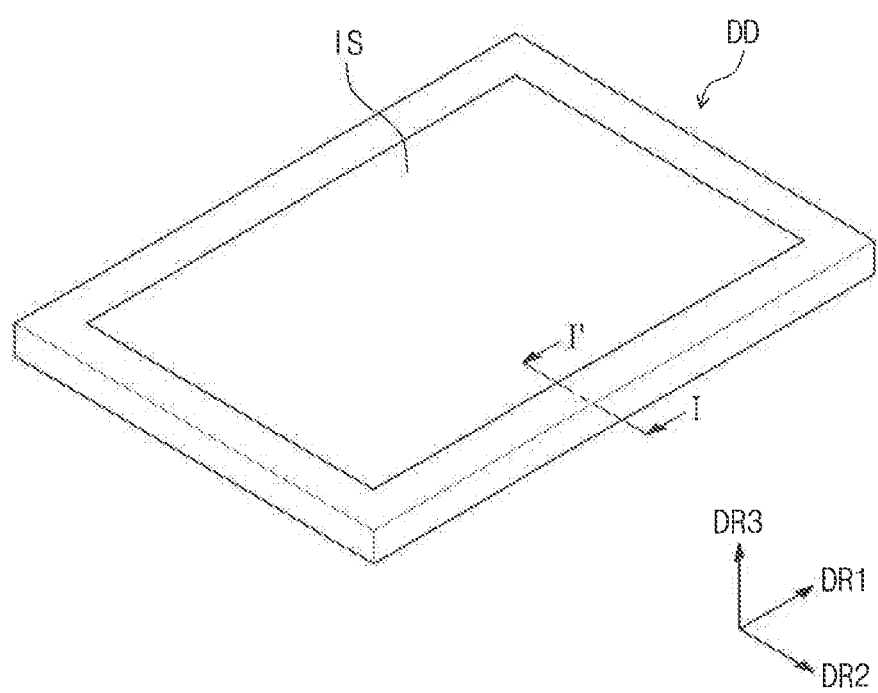
FIG. 1 is a perspective view illustrating a display device according to an exemplary embodiment of the present invention.

Exemplary embodiments of the present invention will be described more fully hereinafter with reference to the accompanying drawings. It is to be understood that the present invention may, however, be embodied in many different forms, and thus should not be construed as being limited to the exemplary embodiments set forth herein. In the figures, like reference numerals refer to like elements throughout.

It will be understood that when an element such as a layer, region or substrate is referred to as being "on" another element, the element may be directly on the other element or intervening elements. In the drawings, sizes and thicknesses of layers and regions may be exaggerated for clarity. In addition, variations from the shapes, which are illustrated in the following figures, as a result, for example, of manufacturing techniques and/or tolerances, are to be expected. Thus, exemplary embodiments of the present invention should not be construed as limited to the shapes of regions illustrated herein but are to include deviations in shapes that result, for example, from manufacturing. For example, an etching region illustrated as a rectangle will, typically, have rounded or curved features.

FIG. 1 is a perspective view illustrating a display device according to an exemplary embodiment of the present invention.

Referring to FIG. 1, a display device DD may display an image through a display surface IS. In FIG. 1, the display surface IS may be parallel to a plane defined by a first direction DR1 and a second direction DR2 intersecting the first direction DR1. However, exemplary embodiments of the present invention are not limited thereto. In an exemplary embodiment of the present invention, a display surface of a display device may have a bent or curved shape.

A thickness direction of the display device DD is indicated by a third direction DR3. A front surface (or, e.g., a top surface) and a back surface (or, e.g., a bottom surface) of each of members are defined by the third direction DR3. However, directions indicated by the first, second and third directions DR1, DR2 and DR3 (may be changed into other directions).

The display device DD may be used in large-sized electronic devices (e.g., televisions, monitors, and external billboards) and small and middle-sized electronic devices (e.g., personal computers, notebook computers, personal digital assistants (PDAs), car navigation units, game consoles, portable electronic devices, and cameras). However, these are provided only as exemplary embodiments of the present invention. In exemplary embodiments of the present invention, the display device DD may be applied to other various electronic devices.

Figure 2:
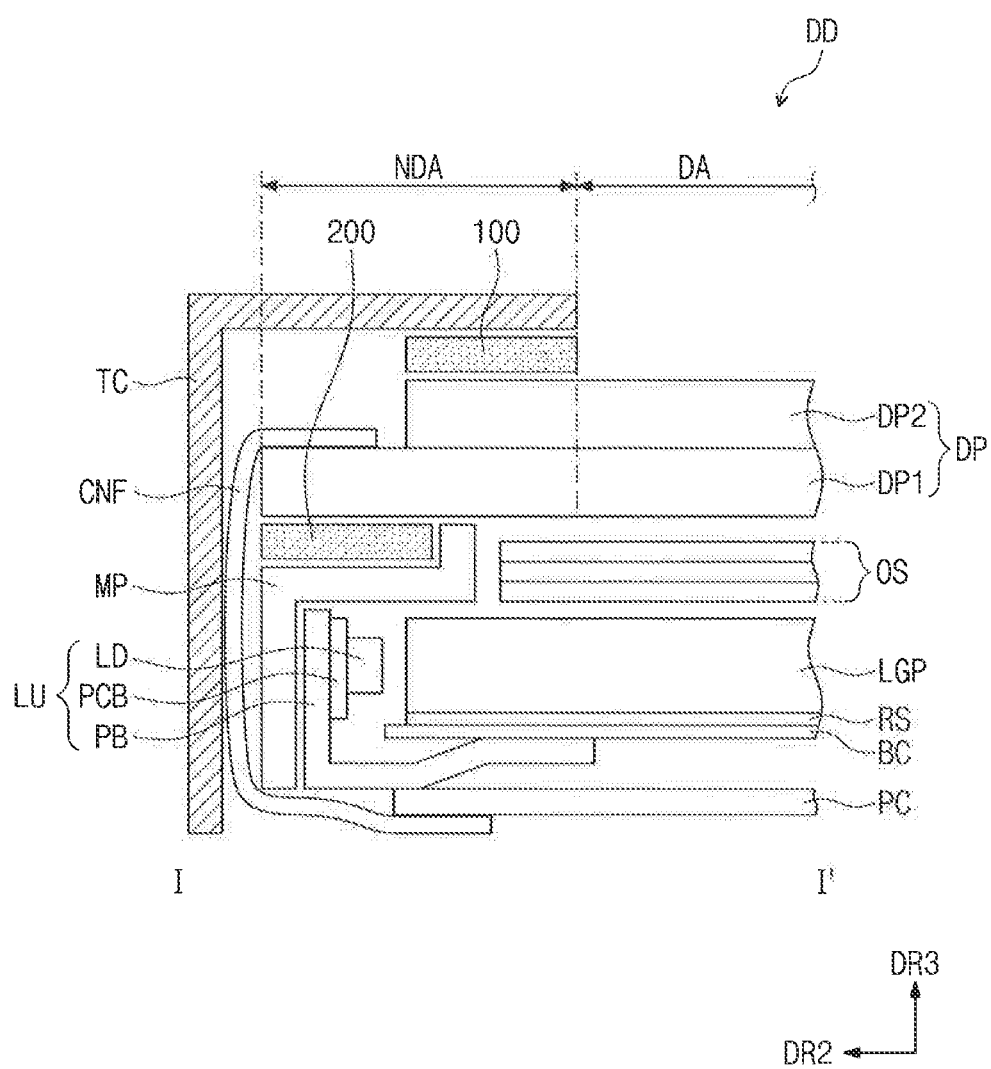
FIG. 2 is a cross-sectional view taken along a line I-I' of FIG. 1 according to an exemplary embodiment of the present invention.

FIG. 2 is a cross-sectional view taken along a line I-I' of FIG. 1 according to an exemplary embodiment of the present invention.

Referring to FIG. 2, the display device DD may include a top chassis TC, a display panel DP, a printed circuit board PC, a connection film CNF, a middle frame MP, spacer members 100 and 200, a light guide plate LGP, a light source unit LU, optical sheets OS, a reflective sheet RS, and a bottom chassis BC.

The display panel DP generates an image corresponding to inputted image data. The display panel DP according to the present embodiment may be, but is not limited to, a liquid crystal display panel, an organic light emitting display panel, a plasma display panel, an electrophoretic display panel, or an electrowetting display panel. The display panel DP corresponding to the liquid crystal display panel will be described as an example in the present embodiment.

The display panel DP may include a first substrate DP1, a second substrate DP2 facing the first substrate DP1, and a liquid crystal layer disposed between the first substrate DP1 and the second substrate DP2. The liquid crystal layer may include a plurality of liquid crystal molecules, an arrangement state of the liquid crystal molecules is changed by an electric field formed between the first substrate DP1 and the second substrate DP2. In addition, each of a pair of polarizing plates may be disposed on and under the display panel DP, respectively.

A plurality of the connection films CNF may be disposed adjacent to at least one side of the first substrate DP1. Data driving chips may be disposed on the plurality of connection films CNF. The data driving chips may generate data signals, which will be applied to data lines of the display panel DP, in response to external signals. The external signals may be signals supplied from the printed circuit board PC and may include image signals, various control signals, and a driving voltage. The printed circuit board PC may be electrically connected to the display panel DP through the plurality of connection films CNF. The connection films CNF may be disposed on a surface of the printed circuit board PC. The connection films CNF may be a tape carrier package TCP or a Chip on film COF.

A display surface of the display panel DP may include a display area DA and a non-display area NDA. The display area DA may be an area for displaying an image, and the non-display area NDA may surround the display area DA in a plan view and may be an area in which an image is not displayed.

The top chassis TC is disposed on the display panel DP. For example, the top chassis TC may be disposed on the second substrate DP2. The top chassis TC may cover the non-display area NDA of the display panel DP. In the present embodiment, the top chassis TC covers an entire portion of the non-display area NDA. However, exemplary embodiments of the present invention are not limited thereto. In an exemplary embodiment of the present invention, the top chassis TC may cover only a corner of the display panel DP, on which the connection film CNF is disposed. For example, only a portion of the non-display area NDA may be covered by the connection film CNF.

The middle frame MP is disposed under the display panel DP. For example, the middle frame MP may be disposed under the first substrate DP1. The middle frame MP may support the non-display area NDA of the display panel DP.

The spacer members 100 and 200 may be disposed between the top chassis TC and the display panel DP and between the middle frame MP and the display panel DP, respectively. One surface or both surfaces of each of the spacer members 100 and 200 may have adhesive strength. In addition, each of the spacer members 100 and 200 may be formed of a hard material or may be formed of an elastic material. For example, some spacer members (e.g., 100) may be formed of the elastic material, and other spacer members (e.g., 200) may be formed of the hard material.

The light source unit LU may be disposed at a side of the light guide plate LGP. The light source unit LU may include a light source LD, a printed circuit board PCB, and an extrusion bar PB. The light source LD may be mounted on the printed circuit board PCB (e.g., a front surface of the printed circuit board PCB) and may be provided with a driving voltage from the printed circuit board PCB. The light source LD provided with the driving voltage may provide light to the light guide plate LGP. The extrusion bar PB may be disposed on a rear surface of the printed circuit board PCB, opposite to the front surface, and may discharge heat generated from the light source LD to the outside. The extrusion bar PB may be omitted in an exemplary embodiment of the present invention.

The light guide plate LGP may receive light from the light source LD and may guide the received light toward the display panel DP. The light guide plate LGP may be formed of, but is not limited to, polyamide (PA), polymethyl methacrylate (PMMA), methyl methacrylate-styrene (MS), or polycarbonate (PC).

In the present embodiment, the light source LD is adjacent to one side surface of the light guide plate LGP. For example, the light source LD may be disposed on the one side surface of the light guide plate LGP. However, exemplary embodiments of the present invention are not limited thereto. In an exemplary embodiment of the present invention, the light sources LD may be disposed on the one side surface and another side surface of the light guide plate LGP. In an exemplary embodiment of the present invention, the light source LD may be disposed under the display panel DP to provide light to the display panel DP, and the light guide plate LGP may be omitted.

The optical sheets OS may be disposed between the light guide plate LGP and the display panel DP. In an exemplary embodiment of the present invention, the optical sheets OS may be curved on the light guide plate LGP to correspond to a curvature of the light guide plate LGP. The optical sheets OS may control a path of the light guided from the light guide plate LGP.

The optical sheets OS may include a diffusion sheet, a prism sheet, and a protective sheet. The diffusion sheet may diffuse light, and the prism sheet may condense the light diffused by the diffusion sheet in such a way that a traveling direction of the diffused light approaches the thickness direction (e.g., the third direction DR3) of the display panel DP. The prism sheet may include a plurality of prism sheets. The protective sheet may protect the prism sheet from an external impact. In the present embodiment, the optical sheets OS include one diffusion sheet, one prism sheet, and one protective sheet. However, exemplary embodiments of the present invention are not limited thereto. In exemplary embodiments of the present invention, the diffusion sheet, the prism sheet or the protective sheet may be provided in plurality in the optical sheets OS or may be omitted.

The reflective sheet RS may be disposed between the light guide plate LGP and the bottom chassis BC. The reflective sheet RS may reflect light leaked from the light guide plate LGP to provide the leaked light back to the light guide plate LGP. However, in an exemplary embodiment of the present invention, the reflective sheet RS may be omitted. In this case, a top surface of the bottom chassis BC may be coated with a light reflecting material, and thus the bottom chassis BC may perform the function of the reflective sheet RS. The light reflecting material may include at least one of commonly used materials.

Figure 3:
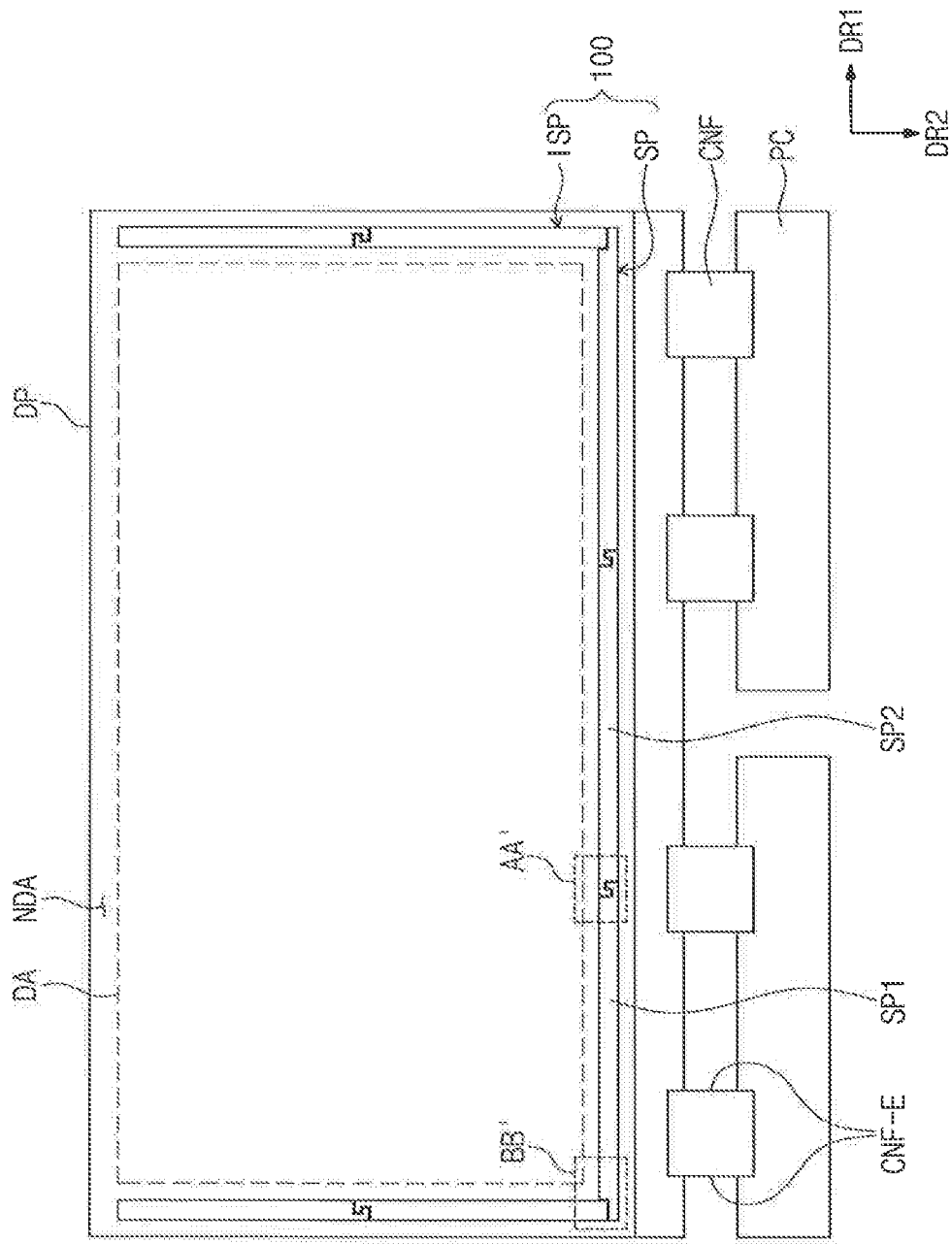
FIG. 3 is a plan view illustrating a display device according to an exemplary embodiment of the present invention.

FIG. 3 is a plan view illustrating a display device according to an exemplary embodiment of the present invention.

FIG. 3 illustrates the display panel DP, the connection film CNF, the printed circuit board PC and a plurality of the spacer members 100 of the display device DD of FIG. 2.

The spacer members 100 may be disposed in the non-display area NDA of the display panel DP. For example, the spacer members 100 may be disposed on one surface of the display panel DP.

In FIG. 3, the spacer members 100 are disposed adjacent to three sides of the display panel DP. However, exemplary embodiments of the present invention are not limited thereto. In an exemplary embodiment of the present invention, the spacer members 100 may be disposed adjacent to only one side of the display panel DP or may be disposed adjacent to only two sides of the display panel DP which face each other. In addition, the spacer members 100 may be disposed adjacent to only two sides of the display panel DP which meet each other to form a predetermined angle. In an exemplary embodiment of the present invention, the spacer members 100 may be disposed adjacent to all of four sides of the display panel DP.

The plurality of the spacer members 100 may include spacer members SP extending in the first direction DR1 and spacer members ISP extending in the second direction DR2 intersecting the first direction DR1. Hereinafter, the spacer members ISP extending in the second direction DR2 may be referred to as 'intersection spacer members ISP' for the purpose of ease and convenience in description.

One of the spacer members SP may be referred to as 'a first spacer member SP1', and another of the spacer members SP may be referred to as 'a second spacer member SP2'. Each of the first and second spacer members SP1 and SP2 may include two long sides. Each of the two long sides may extend in the first direction DR1, and the two long sides may be spaced apart from each other in the second direction DR2.

Each of the first and second spacer members SP1 and SP2 may include an outer line. The outer line of the first spacer member SP1 may connect the two long sides of the first spacer member SP1 to each other, and the outer line of the second spacer member SP2 may connect the two long sides of the second spacer member SP2 to each other.

The outer lines of the first and second spacer members SP1 and SP2 may have, for example, a meandering shape, a slanted shape, and/or a bent shape. For example, the outer lines of the first and second spacer members SP1 and SP2 may include a plurality of lines that connect to each other, extend in different directions (e.g., the first or second directions DR1 or DR2), and connect a first long side to a second long side, opposite the first long side, of a spacer member SP (e.g., SP1 and SP2) to each other. The plurality of lines may be straight lines, curved lines or a combination thereof. In other words, according to the present embodiment, a path between the first and second spacer members SP1 and SP2 may include different directions (e.g., a non-direct path) to reduce an inflow of dust and/or liquid (e.g., a cleaning solution used in a manufacturing process) and to increase an inflow time of the dust and/or the liquid. The shape of the outer line will be further described later with reference to FIGS. 5 to 12.

In addition, a boundary (e.g., gap) between the spacer members SP disposed between the display area DA and the connection film CNF in a plan view may overlap with the connection film CNF when viewed in the second direction DR2. In this case, even though a cleaning solution flows in a direction from the display panel DP to the connection film CNF in a process of cleaning the display panel DP, the cleaning solution may flow down from the display panel DP and along a top surface of the connection film CNF. Thus, the cleaning solution may be inhibited from permeating to both end portions CNF-E of the connection film CNF.

Each of the intersection spacer members ISP may include two long sides and an intersection outer line connecting the two long sides to each other. The two long sides of the intersection spacer member ISP may extend in the second direction DR2 and may be spaced apart from each other in the first direction DR1.

One of the spacer members SP and one of the intersection spacer members ISP may face each other in an area adjacent to a corner of the display panel DP. An intersection outer line, adjacent to the spacer member SP, of the intersection outer lines of the intersection spacer members ISP may be a first intersection outer line. A line, facing the first intersection outer line, of the spacer members SP may be a second intersection outer line. The first intersection outer line and the second intersection outer line may face each other and may have shapes corresponding to each other. The first intersection outer line and the second intersection outer line may each include a plurality of lines extending in different directions from each other. The first intersection outer line and the second intersection outer line will be further described with reference to FIGS. 13 to 16.

Figure 4:
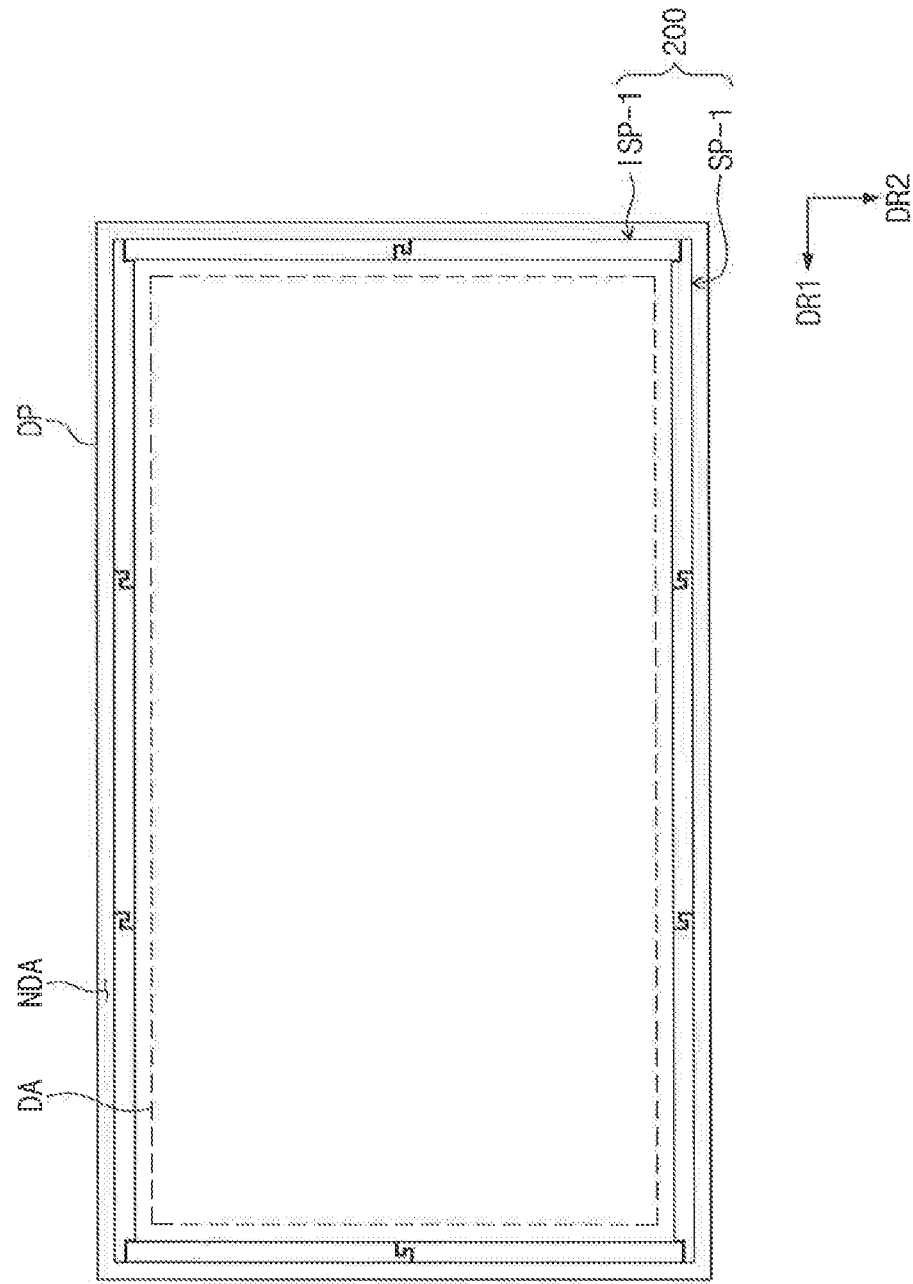
FIG. 4 is a plan view illustrating a display device according to an exemplary embodiment of the present invention.

FIG. 4 is a plan view illustrating a display device according, to an exemplary embodiment of the present invention. FIG. 4 illustrates a back surface of the display panel DP.

The spacer members 200 are disposed on the back surface of the display panel DP. Hereinafter, the spacer members 200 may be referred to as opposite spacer members 200. The opposite spacer members 200 may be disposed between the display panel DP and the middle frame MP (see, e.g., FIG. 2).

The opposite spacer members 200 may include spacer members SP-1 extending in the first direction DR1 and spaced apart from each other in the first direction DR1, and intersection spacer members ISP-1 extending in the second direction DR2 and spaced apart from each other in the second direction DR2.

The spacer members SP-1 of FIG. 4 may have shapes similar to those of the spacer members SP of FIG. 3, and the intersection spacer members ISP-1 of FIG. 4 may have shapes similar to those of the intersection spacer members ISP of FIG. 3. Thus, the descriptions thereto may be omitted, and the descriptions of the opposite spacer members 200 may be substantially the same as the spacer members 100 mentioned with reference to FIG. 3.

Figure 5:
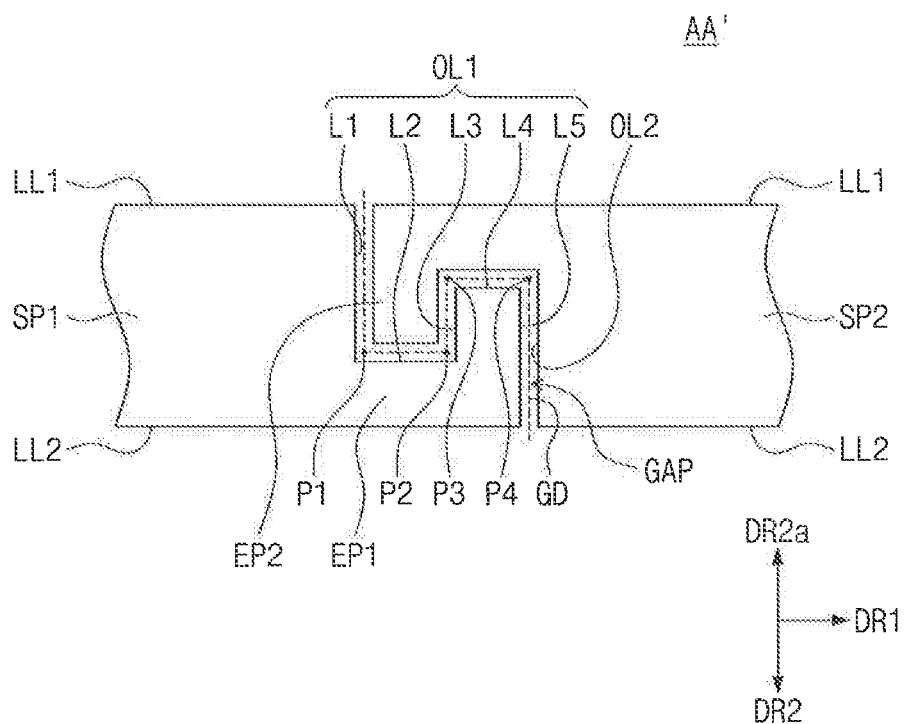
FIG. 5 is an enlarged plan view of a portion AA' of FIG. 3 according to an exemplary embodiment of the present invention.

FIG. 5 is an enlarged plan view of a portion AA' of FIG. 3 according to an exemplary embodiment of the present invention. FIG. 5 is an enlarged plan view illustrating a portion of the first spacer member SP1 and a portion of the second spacer member SP2.

A first outer line OL1 of the first spacer member SP1 may face a second outer line OL2 of the second spacer member SP2, and the first and second outer lines OL1 and OL2 may each have a hooked shape such that the first and second spacer members SP1 and SP2 may be engaged with each other. Thus, an end portion EP1 of the first spacer member SP1 adjacent to the second spacer member SP2 may have a shape that is engaged with a shape of an end portion EP2 of the second spacer member SP2 adjacent to the first spacer member SP1. For example, the end portion EP1 may be interlocked with the end portion EP2.

The first outer line OL1 may include lines L1, L2, L3, L4 and L5 extending in different directions from each other. The second outer line OL2 may also include lines extending in different directions from each other. Since the second outer line OL2 has a shape corresponding to a shape of the first outer line OL1, the first outer line OL1 will be described hereinafter, and descriptions to the second outer line OL2 may be omitted.

For example, the first outer line OL1 may include a first line L1 extending from a first long side LL1 in a direction toward a second long side LL2, a second line L2 extending from the first line L1 in a first direction DR1, a third line L3 extending from the second line L2 in a direction toward the first long side LL1, a fourth line L4 extending from the third line L3 in the first direction DR1, and a fifth line L5 extending from the fourth line L4 to the second long side LL2 to be connected to the second long side LL2.

Hereinafter, the direction from the first long side LL1 toward the second long side LL2 may correspond to the second direction DR2, and a direction from the second long side LL2 toward the first long side LL1 may correspond to a second direction DR2$a$ opposite to the second direction DR2.

In addition, a direction GD of a gap GAP between the first spacer member SP1 and the second spacer member SP2 may be changed at least four times. For example, the gap GAP may include a plurality of straight portions extending in different directions from each other. Hereinafter, the direction GD of the gap GAP may correspond to an extension direction of a line that links central points between the first outer line OL1 and the second outer line OL2. The direction GD of the gap GAP is shown by a dotted line in FIG. 5.

In FIG. 5, the direction GD of the gap GAP may be changed at four points P1, P2, P3 and P4 between the first outer line OL1 and the second outer line OL2. The direction GD of the gap GAP may be changed from the second direction DR2 into the first direction DR1 at a first point P1 and may be changed from the first direction DR1 into the second direction DR2$a$ at a second point P2. In addition, the direction GD of the gap GAP may be changed from the second direction DR2$a$ into the first direction DR1 at a third point P3 and may be changed from the first direction DR1 into the second direction DR2 at a fourth point P4.

Thus, even though the gap GAP exists between the first spacer member SP1 and the second spacer member SP2, an inflow path of, for example, dust and the like may be complicated to reduce the inflow of dust and the like.

Figure 6:
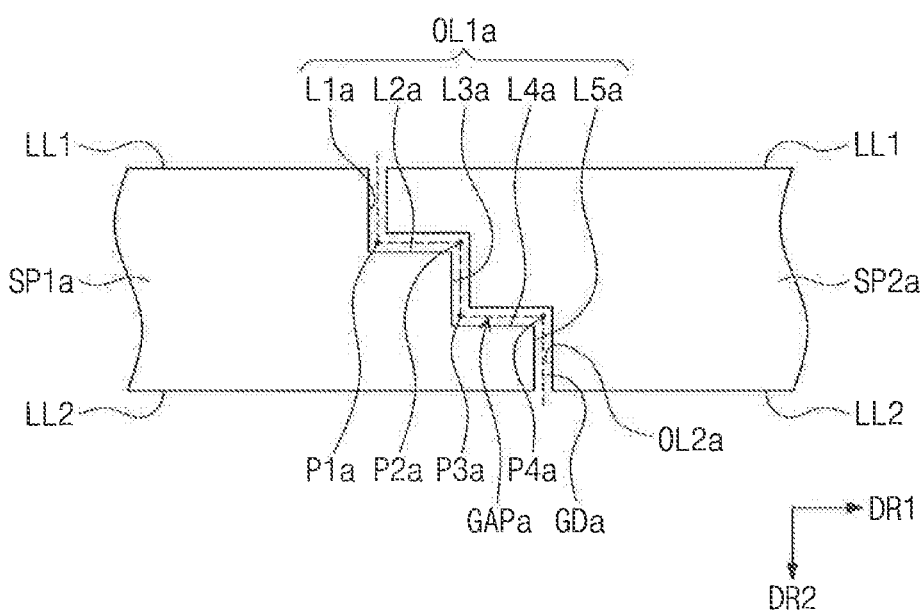
FIG. 6 is an enlarged plan view illustrating a portion of a display device according to an exemplary embodiment of the present invention.

FIG. 6 is an enlarged plan view illustrating a portion of a display device according to an exemplary embodiment of the present invention. In addition, a portion of a display device illustrated in FIG. 6 may correspond to the portion AA' of FIG. 3.

Referring to FIG. 6, a first outer line OL1$a$ of a first spacer member SP1$a$ may face a second outer line OL2$a$ of a second spacer member SP2$a$, and the first and second outer lines OL1$a$ and OL2$a$ may have stepped shapes.

The first outer line OL1$a$ may include lines L1$a$, L2$a$, L3$a$, L4$a$ and L5$a$ extending in different directions. The second outer line OL2$a$ may also include lines extending in different directions. Since the second outer line OL2$a$ has the shape corresponding to the shape of the first outer line OL1$a$, the first outer line OL1$a$ will be described hereinafter, and the descriptions to the second outer line OL2$a$ may be omitted.

In addition, the first outer line OL1$a$ may include a first L1$a$ extending from a first long side LL1 in a direction toward a second long side LL2, a second line L2$a$ extending from the first line L1$a$ in a first direction DR1, a third line L3$a$ extending from the second line L2$a$ in a direction toward the second long side LL2, a fourth line L4$a$ extending from the third line L3$a$ in the first direction DR1, and a fifth line L5$a$ extending from the fourth line L4$a$ to the second long side LL2 to be connected to the second long side LL2.

In addition, a direction GDa of a gap GAPa between the first spacer member SP1$a$ and the second spacer member SP2$a$ may be changed at least four times. In FIG. 6, the direction GDa of the gap GAPa may be changed at four points P1$a$, P2$a$, P3$a$ and P4$a$. The direction GDa of the gap GAPa may be changed from the second direction DR2 into the first direction DR1 at a first point P1$a$ and may be changed from the first direction DR1 into the second direction DR2 at a second point P2$a$. In addition, the direction GDa of the gap GAPa may be changed from the second direction DR2 into the first direction DR1 at a third point P3$a$ and may be changed from the first direction DR1 into the second direction DR2 at a fourth point P4$a$.

Figure 7:
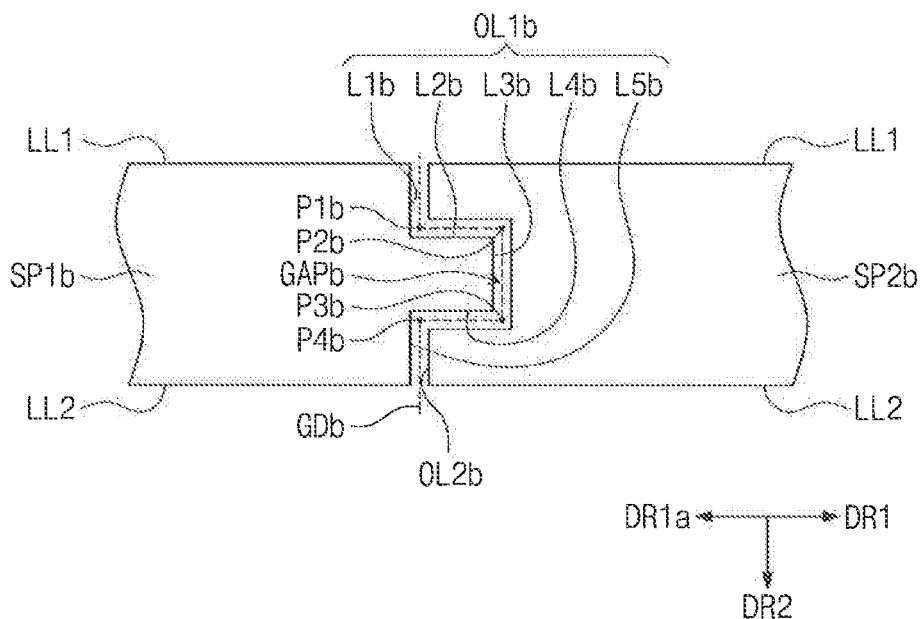
FIG. 7 is an enlarged plan view illustrating a portion of a display device according to an exemplary embodiment of the present invention.

FIG. 7 is an enlarged plan view illustrating a portion of a display device according to an exemplary embodiment of the present invention. In addition, a portion of a display device illustrated in FIG. 7 may correspond to the portion AA' of FIG. 3.

Referring to FIG. 7, a first outer line OL1b of a first spacer member SR1b may face a second outer line OL2b of a second spacer member SP2b. One of the first and second outer lines OL1b and OL2b may have a concave shape, and the other of the first and second outer lines OL1b and OL2b may have a convex shape engaged with (e.g., disposed in) the concave shape.

In an exemplary embodiment of the present invention, an end portion of the first spacer member SP1b may have a convex protrusion shape, and an end portion of the second spacer member SP2b may have a shape surrounding the convex protrusion shape of the first spacer member SP1b.

The first outer line OL1b may include lines L1b, L2b, L3b, L4b and L5b extending in different directions. The second outer line OL2b may also include lines extending in different directions. Since the second outer line OL2b has the shape corresponding to the shape of the first outer line OL1b, the first outer line OL1b will be described hereinafter, and the descriptions to the second outer line OL2b may be omitted.

For example, the first outer line OL1b may include a first line L1b extending from a first long side LL1 in a direction toward a second long side LL2, a second line L2b extending from the first line L1b in a first direction DR1, a third line L3b extending from the second L2b in a direction toward the second long side LL2, a fourth line L4b extending from the third line L3b in a first direction DR1a opposite to the first direction DR1, and a fifth line L5b extending from the fourth line L4b to the second long side LL2 to be connected to the second long side LL2.

In addition, a direction GDb of a gap GAPb between the first spacer member SP1b and the second spacer member SP2b may be changed at four points P1b, P2b, P3b and P4b. The direction GDb of the gap GAPb may be changed from the second direction DR2 into the first direction DR1 at a first point P1b and may be changed from the first direction DR1 into the second direction DR2 at a second point P2b. In addition, the direction GDb of the gap GAPb may be changed from the second direction DR2 into the first direction DR1a at a third point P3b and may be changed from the first direction DR1a into the second direction DR2 at a fourth point P4b.

Figure 8:
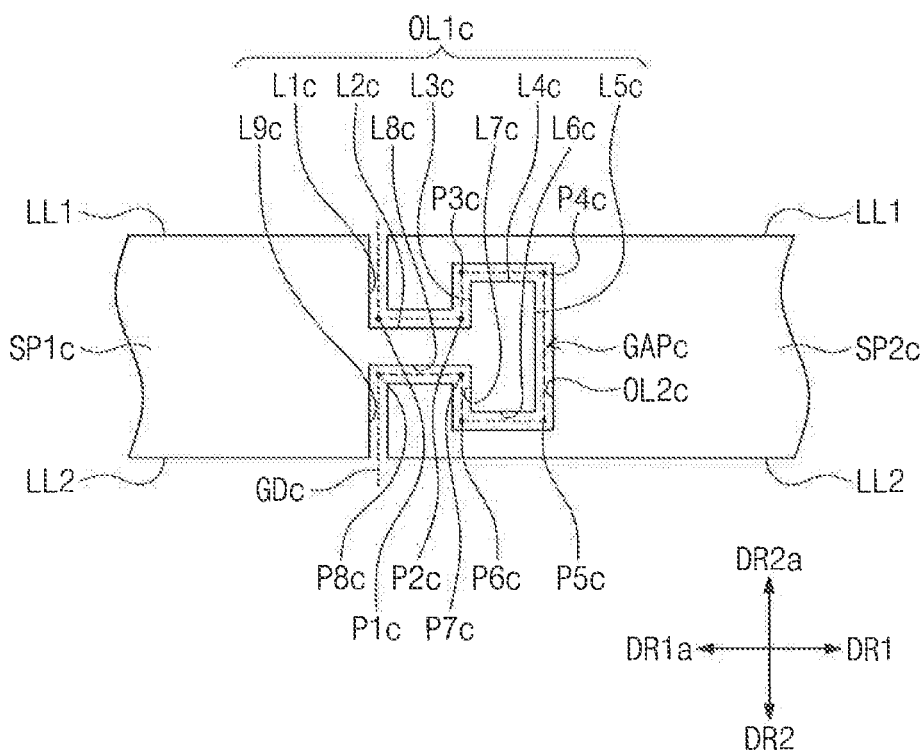
FIG. 8 is an enlarged plan view illustrating a portion of a display device according to an exemplary embodiment of the present invention.

FIG. 8 is an enlarged plan view illustrating a portion of a display device according to an exemplary embodiment of the present invention. In addition, a portion of a display device illustrated in FIG. 8 may correspond to the portion AA' of FIG. 3.

Referring to FIG. 8, a first outer line OL1c of a first spacer member SP1c and a second outer line OL2c of a second spacer member SP2c may face each other and may be engaged with each other. Thus, the first and second spacer members SP1c and SP2c may appear interlocked with each other. An end portion of the first spacer member SP1c may have a convex protrusion shape, and an end portion of the second spacer member SP2c may have a shape surrounding the convex protrusion shape of the first spacer member SP1c. For example, the end portion of the first spacer member SP1c may have a "T" shape and the end portion of the second spacer member SP2c may have a recess with a "T" shape to receive the end portion of the first spacer member SP1c.

Since the second outer line OL2c has the shape corresponding to the shape of the first outer line OL1c, the first outer line OL1c will be described hereinafter, and the descriptions to the second outer line OL2c may be omitted.

In addition, the first outer line OL1c may include a first line L1c extending from a first long side LL1 in a direction toward a second long side LL2, a second line L2c extending from the first line L1c in a first direction DR1, a third line L3c extending from the second line L2c in a direction toward the first long side LL1, a fourth line L4c extending from the third line L3c in the first direction DR1, a fifth line L5c extending from the fourth line L4c toward the second long side LL2, a sixth line L6c extending from the fifth line L5c in a first direction DR1a opposite to the first direction DR1, a seventh line L7c extending from the sixth line L6c in the direction toward the first long side LL1, an eighth line L8c extending from the seventh line L7c in the first direction DR1a, and a ninth line L9c extending from the eighth line L8c to the second long side LL2 to be connected to the second long side LL2.

In addition, a direction GDc of a gap GAPc between the first spacer member SP1c and the second spacer member SP2c may be changed at eight points P1c, P2c, P4c, P5c, P6c, and P8c. The direction GDc of the gap GAPc may be changed from the second direction DR2 into the first direction DR1 at a first point P1c and may be changed from the first direction DR1 into the second direction DR2a at a second point P2c. In addition, the direction GDc of the gap GAPc may be changed from the second direction DR2a into the first direction DR1 at a third point P3c and may be changed from the first direction DR1 into the second direction DR2 at a fourth point P4c. Moreover, the direction GDc of the gap GAPc may be changed from the second direction DR2 into the first direction DR1a at a fifth point P5c and may be changed from the first direction DR1a into the second direction DR2a at a sixth point P6c. Furthermore, the direction GDc of the gap GAPc may be changed from the second direction DR2a into the first direction DR1a at a seventh point P7c and may be changed from the first direction DR1a into the second direction DR2 at an eighth point P8c.

Figure 9:
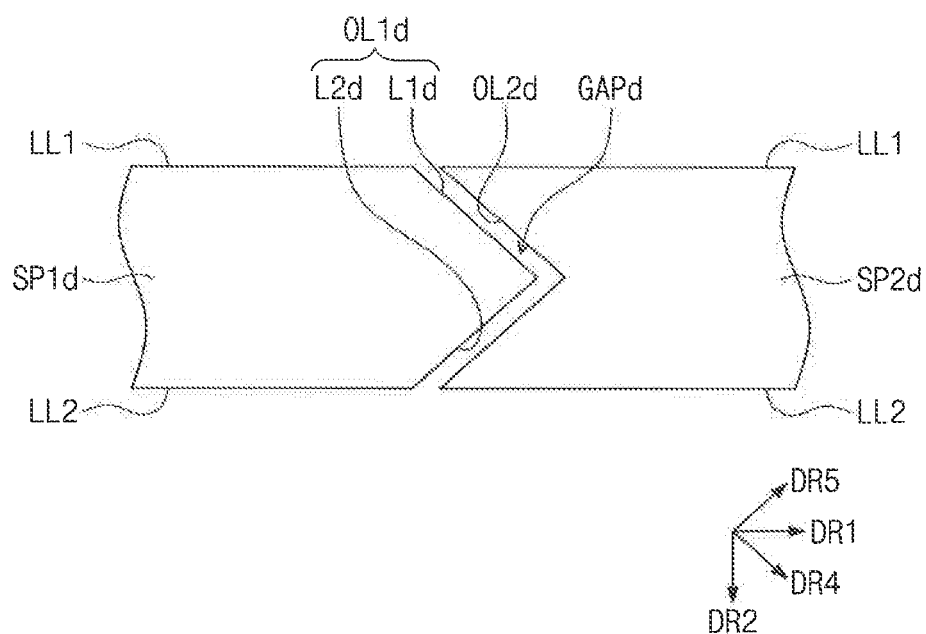
FIG. 9 is an enlarged plan view illustrating a portion of a display device according to an exemplary embodiment of the present invention.

FIG. 9 is an enlarged plan view illustrating a portion of a display device according to an exemplary embodiment of the present invention. In addition, a portion of a display device illustrated in FIG. 9 may correspond to the portion AA' of FIG. 3.

Referring to FIG. 9, a first outer line OL1d of a first spacer member SP1d may face a second outer line OL2d of a second spacer member SP2d, and each of the first and second outer lines OL1d and OL2d may have a zigzag shape. In other words, a gap GAPd may have a meandering shape when viewed in a plan view. For example, the first and second outer lines OL1d and OL2d may each have 'V' or 'U' like shapes. Since the first and second outer lines OL1d and OL2d may be made up of straight lines in FIG. 9, the gap GAPd may include a plurality of the straight lines.

The first outer line OL1d may include lines L1d and L2d extending in different directions from each other. The second outer line OL2d may also include lines extending in different directions from each other. Since the second outer line OL2d has the shape corresponding to the shape of the first outer line OL1d, the first outer line OL1d will be described hereinafter, and the descriptions to the second outer line OL2d may be omitted.

The first outer line OL1d may include a first line L1d extending in a fourth direction DR4 extending between a first direction DR1 and a second direction DR2 and a second line L2d extending in a fifth direction DR5 intersecting the fourth direction DR4 to be connected with the second long side LL2.

A length of the first outer line OL1d (or the gap GAPd between the first and second spacer members SP1d and SP2d) may increase as an angle between the first line L1d and the second line L2*d* decreases. In other words, an inflow of dust and the like may further be reduced as the angle between the first and second lines L1*d* and L2*d* decreases.

In an exemplary embodiment of the present invention, a direction of the gap GAP*d* may be changed at least once.

Figure 10:
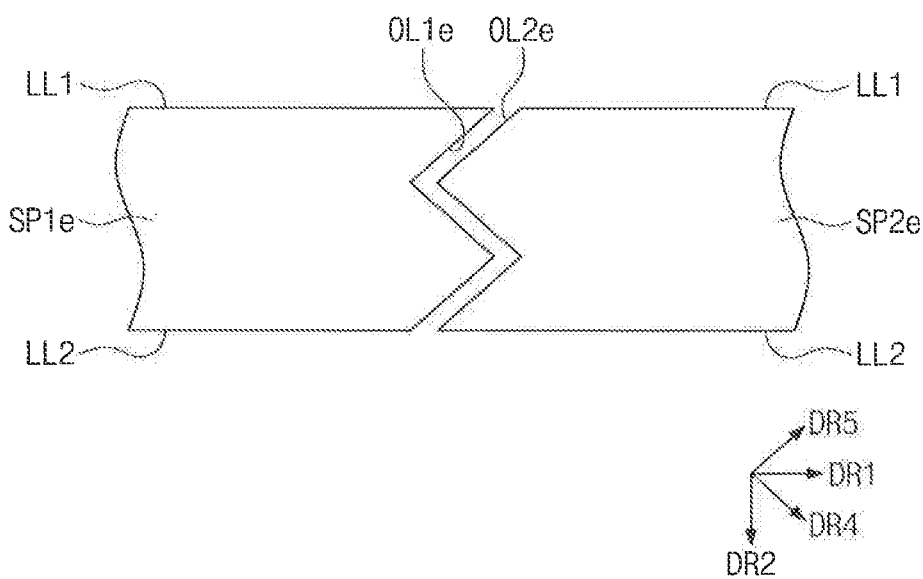
FIG. 10 is an enlarged plan view illustrating a portion of a display device according to an exemplary embodiment of the present invention.

FIG. 10 is an enlarged plan view illustrating a portion of a display device according to an exemplary embodiment of the present invention. In addition, a portion of a display device illustrated in FIG. 10 may correspond to the portion AA' of FIG. 3.

Referring to FIG. 10, a first outer line OL1*e* of a first spacer member SP1*e* may face a second outer line OL2*e* of a second spacer member SP2*e*, and the first and second outer lines OL1*e* and OL2*e* may have zigzag shapes. Since the second outer line OL2*e* has the shape corresponding to the shape of the first outer line OL1*e*, the first outer line OL1*e* will be described hereinafter, and the descriptions to the second outer line OL2*e* may be omitted.

The first outer line OL1*e* of FIG. 10 may have a shape bent once more, as compared with the first outer line OL11*d* of FIG. 9. The first outer line OL1*e* of FIG. 10 may further include a line extending in the fifth direction DR5, as compared with the first outer line OL1*d* of FIG. 9. For example, the first outer line OL1*e* may have a concave and convex 'V' like shape. Thus, a path into which dust may flow may further be increased in length by the shapes of the first and second spacer members SP1*e* and SP2*e* of FIG. 10. As a result, the inflow of dust may further be reduced.

Figure 11:
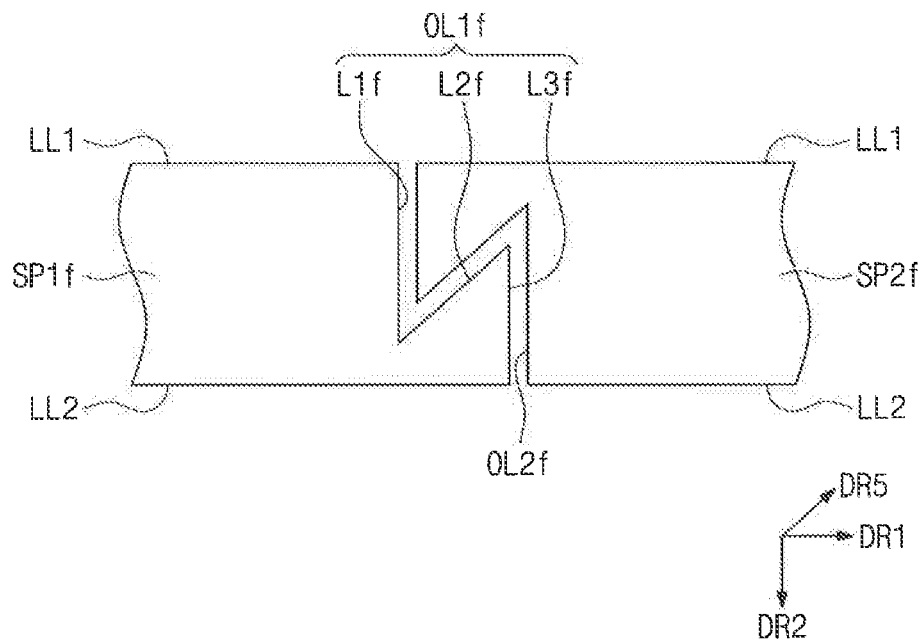
FIG. 11 is an enlarged plan view illustrating a portion of a display device according to an exemplary embodiment of the present invention.

FIG. 11 is an enlarged plan view illustrating a portion of a display device according to an exemplary embodiment of the present invention. In addition, a portion of a display device illustrated in FIG. 11 may correspond to the portion AA' of FIG. 3.

Referring to FIG. 11, a first outer line OL1*f* of a first spacer member SP1*f* may face a second outer OL2*f* of a second spacer member SP2*f*, and the first and second outer lines OL1*f* and OL2*f* may each have a zigzag shape.

Since the second outer line OL2*f* has the shape corresponding to the shape of the first outer line OL1*f*, the first outer line OL1*f* will be described hereinafter, and the descriptions to the second outer line OL2*f* may be omitted.

In addition, the first outer line OL1*f* may include a first line L1*f* extending from a first long side LL1 in a direction toward a second long side LL2, a second line L2*f* extending from the first line L1*f* in the fifth direction DR5, and a third line L3*f* extending from the second line L2*f* in the direction toward the second long side LL2.

Figure 12:
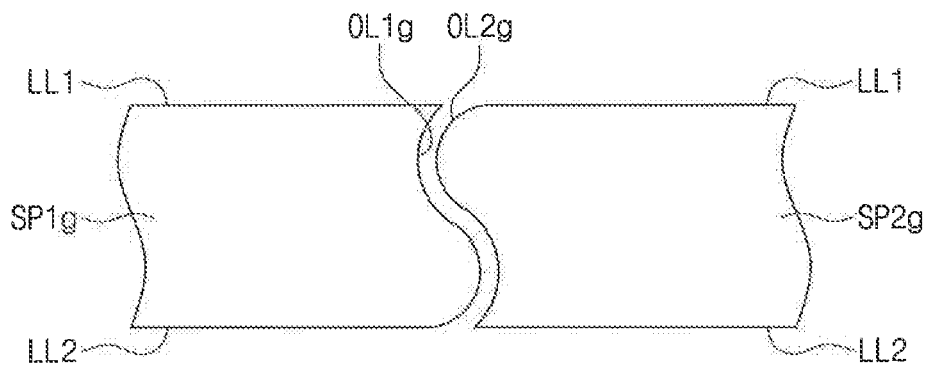
FIG. 12 is an enlarged plan view illustrating a portion of a display device according to an exemplary embodiment of the present invention.

FIG. 12 is an enlarged plan view illustrating a portion of a display device according to an exemplary embodiment of the present invention. In addition, a portion of a display device illustrated in FIG. 12 may correspond to the portion AA' of FIG. 3.

Referring to FIG. 12, a first outer line OL1*g* of a first spacer member SP1*g* may face a second outer line OL2*g* of a second spacer member SP2*g*, and the first and second outer lines OL1*g* and OL2*g* may have meandering shapes. For example, the first and second outer lines OL1*g* and OL2*g* may each have an "S" shape.

The first outer lines described above with reference to FIGS. 5 to 11 include straight lines, but the first and second outer lines OL1*g* and OL2*g* of FIG. 12 may include curved lines.

In addition, a gap is provided between the first outer line OL1*g* and the second outer line OL2*g*. The gap may include a plurality of curved portions. For example, the gap may have an "S" shape.

Figure 13:
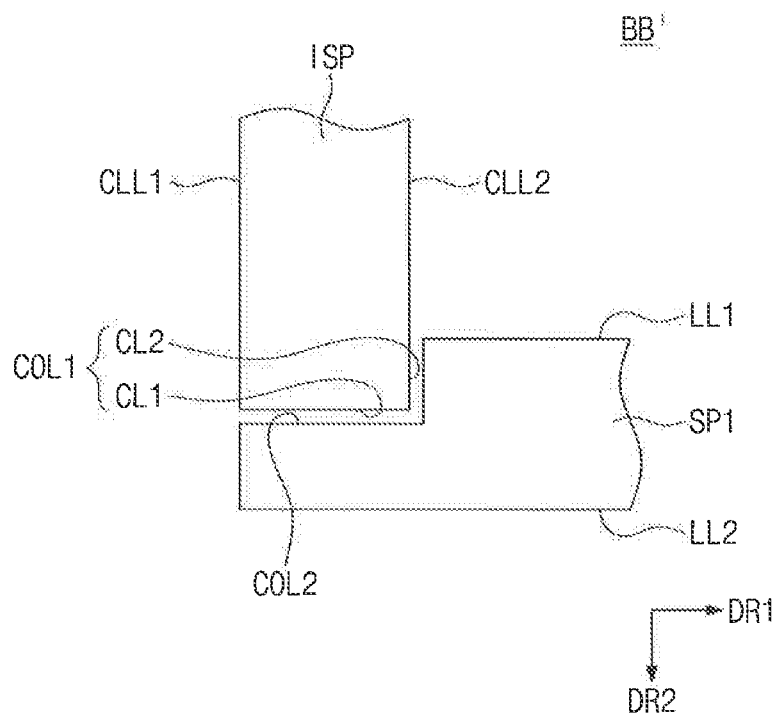
FIG. 13 is an enlarged plan view of a portion BB' of FIG. 3 according to an exemplary, embodiment of the present invention.

FIG. 13 is an enlarged plan view of a portion BB' of FIG. 3.

FIG. 13 is an enlarged plan view illustrating a portion of the intersection spacer member ISP and a portion of the first spacer member SP1. Long sides CLL1 and CLL2 of the intersection spacer member ISP may extend in the second direction DR2, and long sides LL1 and LL2 of the first spacer member SP1 may extend in the first direction DR1.

The intersection spacer member ISP may further include intersection outer lines. One of the intersection outer lines, which is adjacent to the spacer member (e.g., the first spacer member SP1), is a first intersection outer line COL1. In addition, a second intersection outer line COL2 facing the first intersection outer line COL1 is included in the first spacer member SP1. For example, the second intersection outer line COL2 may be recessed in the first spacer member SP1. The first intersection outer line COL1 and the second intersection outer line COL2 may face each other and may be spaced apart from each other by a predetermined gap. Each of the first intersection outer line COL1 and the second intersection outer line COL2 may include a portion of the long side (e.g., CLL2 and LL1).

Each of the first and second intersection outer lines COL1 and COL2 may include a plurality of lines extending in different directions from each other. For example, the first intersection outer line COL1 of FIG. 13 may include a first line CL1 extending from a first long side CLL1 in the first direction DR1 and a second line CL2 extending from the first line CL1 in a direction opposite to the second direction DR2. Here, the second line CL2 may be a portion of a second long side CLL2. The second intersection outer line COL2 may have a shape corresponding to the shape of the first intersection outer line COL1.

According to an exemplary embodiment of the present invention, some of the spacer members 100 and 200 (see, e.g., FIG. 2), which extend in different directions and meet each other, may include the outer lines, each of which includes the lines extending in a plurality of directions in an area in which some of the spacer members meet each other. Thus, a path into which dust and the like may flow may be complicated to reduce an inflow of dust and the like.

Figure 14:
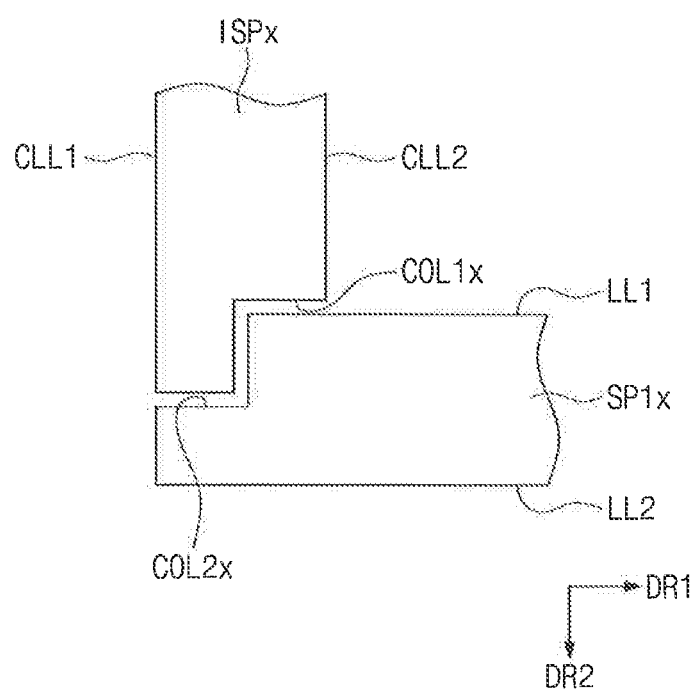
FIG. 14 is an enlarged plan view illustrating a portion of a display device according to an exemplary embodiment of the present invention.

FIG. 14 is an enlarged plan view illustrating a portion of a display device according to an exemplary embodiment of the present invention. In addition, a portion of a display device illustrated in FIG. 14 may correspond to the portion BB' of FIG. 3.

Referring to FIG. 14, a first intersection outer line COL1*x* of an intersection spacer member ISP*x* may face a second intersection outer line COL2*x* of a first spacer member SP1*x*, and each of the first and second intersection outer lines COL1*x* and COL2*x* may have a stepped shape.

The first intersection outer line COL1*x* may include a first line extending in the first direction DR1, a second line extending from the first line in a direction intersecting the first direction DR1, and a third line extending from the second line in the first direction DR1. Correspondingly, the second intersection outer line COL2*x* may also include a first line, a second line, and a third line. For example, the first line may extend in the first direction DR1, the second line may extend from the first line in a direction intersecting the first direction DR1, and the third line may extend from the second line in the first direction DR1. In particular, second intersection outer line COL2*x* of FIG. 14 may include a portion of a first long side LL1 of the first spacer member SP1*x*. For example, the second intersection outer line COL2x may include a portion of the first long side LL1, which overlaps with the intersection spacer member ISPx in the second direction DR2.

Figure 15:
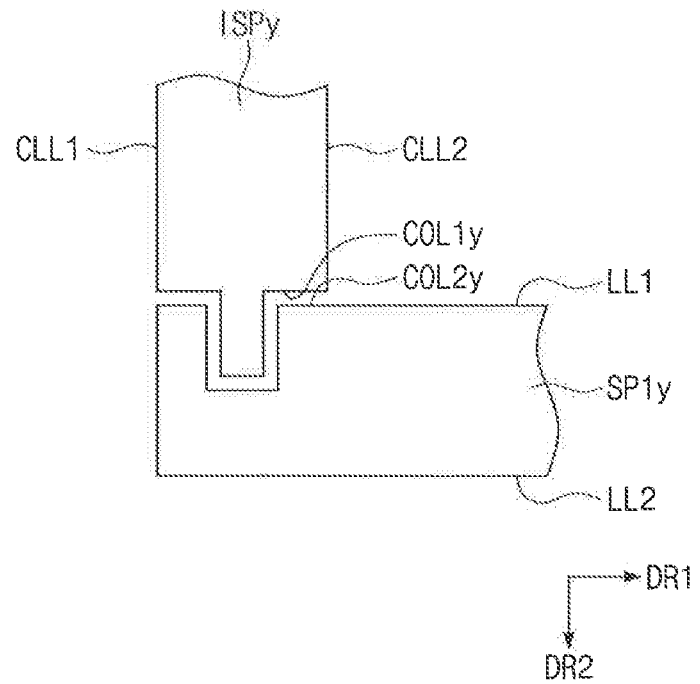
FIG. 15 is an enlarged plan view illustrating a portion of a display device according to an exemplary embodiment of the present invention.

FIG. 15 is an enlarged plan view illustrating a portion of a display device according to an exemplary embodiment of the present invention. In addition, a portion of a display device illustrated in FIG. 15 may correspond to the portion BB' of FIG. 3.

Referring to FIG. 15, a first intersection outer line COL1y of an intersection spacer member ISPy may face a second intersection outer line COL2y of a first spacer member SP1y. The second intersection outer line COL2y may include a portion of a first long side LL1, which overlaps with the intersection spacer member ISPy in the second direction DR2.

One of the first and second intersection outer lines COL1y and COL2y may include a concave shape, and the other of the first and second intersection outer lines COL1y and COL2y may include a convex shape receiving the concave shape. In addition, the first intersection outer line COL1y may have a convex protrusion shape like the first outer line OL1c of FIG. 8, and the second intersection outer line COL2y may have a shape surrounding the convex protrusion shape like the second outer line OL2c of FIG. 8. In addition, the first intersection outer line COL1y and the second intersection outer line COL2y may be similar to the first outer line OL1b and the second outer line OL2b of FIG. 7, respectively.

Figure 16:
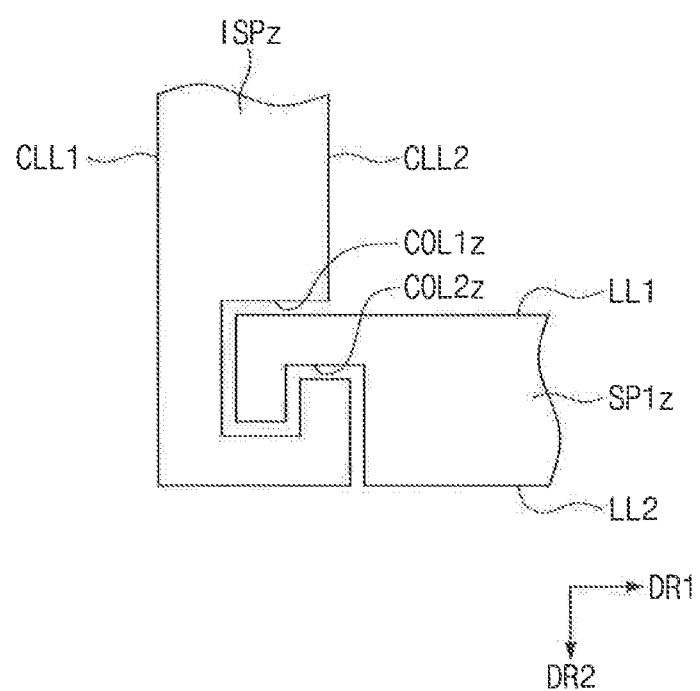
FIG. 16 is an enlarged plan view illustrating a portion of a display device according to an exemplary embodiment of the present invention.

FIG. 16 is an enlarged plan view illustrating a portion of a display device according to an exemplary embodiment of the present invention. In addition, a portion of a display device illustrated in FIG. 16 may correspond to the portion BB' of FIG. 3.

Referring to FIG. 16, a first intersection outer line COL1z of an intersection spacer member ISPz may face a second intersection outer line COL2z of a first spacer member SP1z, and the first and second intersection outer lines COL1z and COL2z may have hook shapes engaged with each other.

For example, the first intersection outer line COL1z may include a first line extending from a second long side CLL2 in a direction opposite to the first direction DR1, a second line extending from the first line in the second direction DR2, a third line extending from the second line in the first direction DR1, a fourth line extending from the third line in a direction opposite to the second direction DR2, a fifth line extending from the fourth line in the first direction DR1, and a sixth line extending from the fifth line in the second direction DR2.

Correspondingly, the second intersection outer line COL2z may include first to sixth lines. In addition, the second intersection outer line COL2z may include a portion of a first long side LL1 and a portion of a second long side LL2, which overlap with the intersection spacer member ISPz in the second direction DR2.

Figure 17:
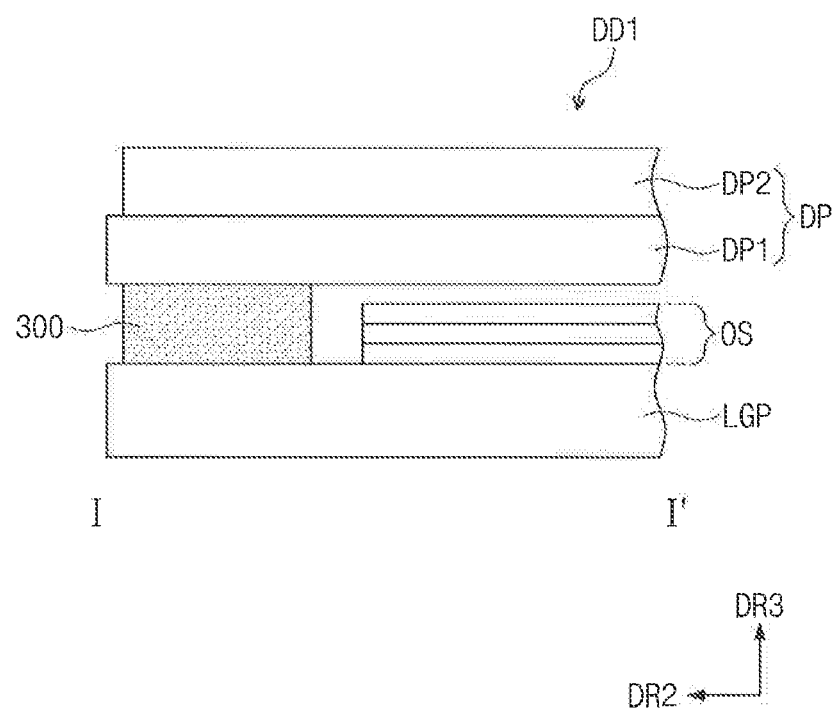
FIG. 17 is a cross-sectional view taken along a line I-I' of FIG. 1 according to an exemplary embodiment of the present invention.
Figure 18:
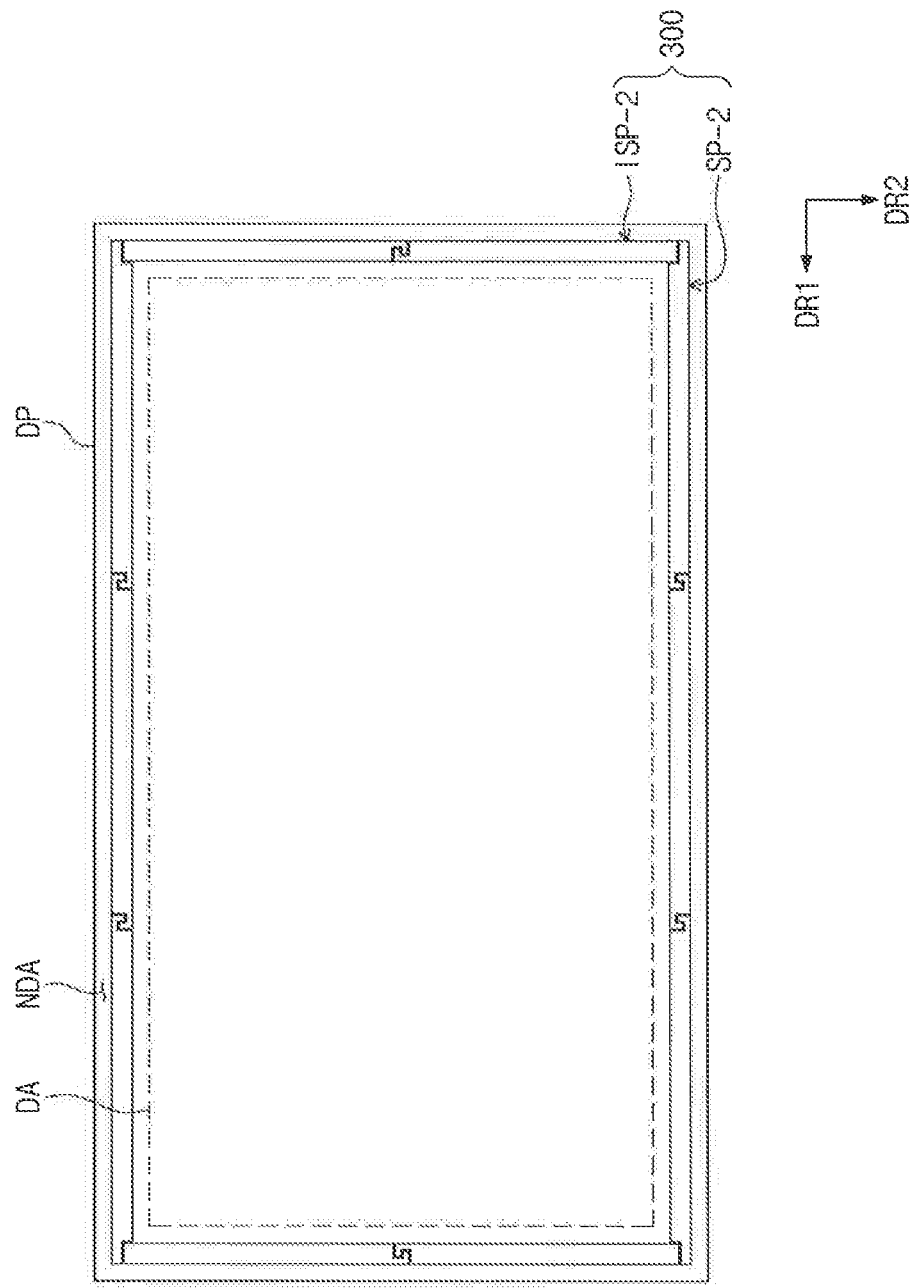
FIG. 18 is a plan view illustrating a display device according to an exemplary embodiment of the present invention.

FIG. 17 is a cross-sectional view taken along a line I-I' of FIG. 1 according to an exemplary embodiment of the present invention. FIG. 18 is a plan view illustrating components of the display device of FIG. 17.

In the present embodiment of FIG. 17, the same components as in the exemplary embodiment of FIG. 2 will be indicated by the same reference designators, and the descriptions thereto may be omitted.

Referring to FIG. 17, a display device DD1 may include the display panel DP, the light guide plate LGP, the optical sheets OS, the light source unit LU (see, e.g., FIG. 2), and spacer members 300 disposed between the display panel DP and the light guide plate LGP. The display device DD1 of FIG. 17 may not include the middle frame MP (see, e.g., FIG. 2) and the top chassis TC (see, e.g., FIG. 2).

Both surfaces of each of the spacer members 300 may have an adhesive property, and thus, the spacer members 300 may couple the display panel DP and the light guide plate LGP to each other. In addition, in an exemplary embodiment of the present invention, one surface of each of the spacer members 300 may have an adhesive property and may be adhered to the display panel DP or the light guide plate LGP.

FIG. 18 illustrates a back surface of the display panel DP and the spacer members 300 disposed on the back surface of the display panel DP.

The spacer members 300 may include spacer members SP-2 extending in the first direction DR1 and spaced apart from each other by a gap in the first direction DR1, and intersection spacer members ISP-2 extending in the second direction DR2 and spaced apart from each other by a gap in the second direction DR2.

An end portion of each of the spacer members SP-2 and the intersection spacer members ISP-2 of FIG. 18 may have at least one of the shapes of the end portions described with reference to FIGS. 5 to 12. In addition, end portions of the spacer member SP-2 and the intersection spacer member ISP-2 adjacent to each other may have at least one of the shapes of the end portions described with reference to FIGS. 13 to 16. In other words, a direction of the gap between the spacer members 300 may not be constant but may be changed at least one time. Thus, even though light is provided into the gap between the spacer members 300, a light leakage phenomenon through the gap may be reduced or minimized since the direction of the gap is not constant.

According to the present invention, the path of the gap between the spacer members may reduce or minimize the inflow of dust and/or liquid (e.g., a cleaning solution used in a manufacturing process).

While the present inventive concept has been described with reference to exemplary embodiments thereof, it will be understood by those of ordinary skill in the art that various changes in form and details may be made thereto without departing from the spirit and scope of the present inventive concept as defined by the following claims.

What is claimed is:

1. A display device comprising:
   a display panel that displays an image;
   a plurality of connection films covering an edge of the display panel and arranged in a first direction;
   a plurality of spacer members disposed on a first surface of the display panel and arranged in the first direction, wherein each of the spacer members comprises: first and second long sides extending in the first direction; and an outer line connecting the first and second long sides to each other, wherein the coater line comprises a plurality of lines extending in different directions; and
   a printed circuit board electrically connected to the display panel through the plurality of connection films,
   wherein a first outer line of a first spacer member of the plurality of spacer members is adjacent to a second outer line of a second spacer member of the plurality of spacer members,
   wherein a shape of the first outer line corresponds to a shape of the second outer line, and
   wherein a gap between the first outer line and the second outer line is aligned with at least one of the plurality of connection films in a second direction intersecting the first direction.

2. The display device of claim 1, wherein the first outer line comprises:

a first line extending from the first long side in the second direction;

a second line extending from the first line in the first direction;

a third line extending from the second line in a direction toward the first long side;

a fourth line extending from the third line in the first direction; and a fifth line extending from the fourth line to the second long side and connected to the second long side.

3. The display device of claim 1, wherein the first outer line comprises:

a first line extending from the first long side in the second direction;

a second line extending from the first line in the first direction;

a third line extending from the second line in the second direction;

a fourth line extending from the third line in the first direction; and a fifth line extending from the fourth line to the second long side and connected to the second long side.

4. The display device of claim 1, wherein the first outer line comprises:

a first line extending from the first long side in the second direction;

a second line extending from the first line in the first direction;

a third line extending from the second line in the second direction;

a fourth line extending from the third line in a direction opposite to the first direction; and a fifth line extending from the fourth line to the second long side and connected to the second long side.

5. The display device of claim 1, wherein the first outer line comprises:

a first line extending from the first long side in the second direction;

a second line extending from the first line in the first direction;

a third line extending from the second line in a direction toward the first long side;

a fourth line extending from the third line in the first direction;

a fifth line extending from the fourth line in the second direction;

a sixth line extending from the fifth line in a direction opposite to the first direction;

a seventh line extending from the sixth line in the direction toward the first long side;

an eighth line extending from the seventh line in the direction opposite to the first direction; and a ninth line extending from the eighth line to the second long side and connected to the second long side.

6. The display device of claim 1, wherein the first outer line has a slanted shape.

7. The display device of claim 6, wherein the first outer line comprises:

a first line extending in a third direction, wherein the third direction is between the first direction and the second direction, and the second direction is perpendicular to the first direction; and a second line extending from the first line in a fourth direction intersecting the third direction.

8. The display device of claim 7, wherein the first outer line further comprises: a third line extending from the first long side in the fourth direction toward the first line, wherein the third line is connected to the first line.

9. The display device of claim 6, wherein the first outer line comprises:

a first line extending from the first long side in the second direction;

a second line extending from the first line in a direction that is toward the first long side and intersects the first direction and the second direction, wherein the second direction is perpendicular to the first direction; and a third line extending from the second line in the second direction.

10. The display device of claim 1, wherein the first outer line is a curved line.

11. The display device of claim 1, further comprising:

intersection spacer members disposed on the first surface of the display panel, wherein each of the intersection spacer members comprises: first and second long sides extending in the second direction; and an intersection outer line connecting the first and second long sides, wherein a first intersection outer line of the intersection outer lines is adjacent to a first spacer member of the plurality of spacer members, wherein a line of the first spacer member, which faces the first intersection outer line, is a second intersection outer line, wherein each of the first and second intersection outer lines comprises: a plurality of lines extending in different directions from each other, and wherein the first and second intersection outer lines face each other and have shapes corresponding to each other.

12. The display device of claim 1, wherein the outer line connects the first and second long sides to each other and comprises at least four lines.

13. The display device of claim 1, further comprising:

a top chassis disposed on the display panel to cover a non-display area of the display panel;

a frame disposed under the display panel to support the display panel; and a plurality of opposite spacer members disposed on a second surface of the display panel opposite to the first surface of the display panel and arranged in the first direction, wherein each of the opposite spacer members comprises: long sides extending in the first direction; and lines connecting the long sides to each other and extending in different directions, wherein the plurality of spacer members is disposed between the display panel and the top chassis, and wherein the plurality of opposite spacer members is disposed between the display panel and the frame.

14. The display device of claim 1, further comprising:

a light guide plate disposed under the display panel; and a light source disposed at a side of the light guide plate to provide light to the light guide plate, wherein the plurality of spacer members is disposed between the display panel and the light guide plate.

15. A display device comprising:

a display panel comprising: a display area that displays an image; and a non-display area that does not display the image;

a plurality of connection films arranged on one side of the non-display area in a first direction;

a first spacer member disposed between the display area and the plurality of connection films; and a second spacer member disposed between the display area and the plurality of connection films, wherein the second spacer member is spaced apart from the first spacer member in the first direction,
wherein a direction of a gap between the first spacer member and the second spacer member is changed at least four times.

16. The display device of claim 15, wherein the gap is aligned with at least one of the plurality of connection films in a second direction intersecting the first direction.

17. The display device of claim 15, wherein an end portion of the first spacer member and an end portion of the second spacer member face each other and have shapes corresponds to each other.

18. A display device comprising:
a display panel that displays an image; and
a plurality of spacer members disposed on a front surface and a back surface of the display panel and arranged in a first direction, wherein the back surface faces away from the front surface, wherein each of the spacer members comprises: a first long side and a second long side, both extending in the first direction; and an outer line connecting the first and second long sides to each other,
wherein the plurality of spacer members comprises a first spacer member including a first outer line and a second spacer member including a second outer line facing the first outer line,
wherein the second long side is opposite the first long side,
wherein the first outer line includes a protrusion and the second outer line includes a recess with a shape to receive the protrusion of the first outer line, and
wherein the front surface and the back surface are outer surfaces of the display panel.

19. The display device of claim 18, wherein the first spacer member and the second spacer member are disposed on the front surface of the display panel, and
the plurality of spacer members further includes a third and a fourth spacer member disposed on the back surface of the display panel, wherein the third spacer member includes a third outer line comprising a plurality of lines extending in different directions from each other, and the fourth spacer member includes a fourth outer line comprising a plurality of lines extending in different directions from each other, wherein a shape of the third outer line corresponds to a shape of the fourth outer line.

20. The display device of claim 19, wherein the shape of the protrusion of the first outer line and the shape of the recess of the second outer line are different from the shape of the third outer line and the shape of the fourth outer line.

* * * * *